(12) United States Patent
Zahm et al.

(10) Patent No.: US 8,462,861 B2
(45) Date of Patent: Jun. 11, 2013

(54) METHODS AND APPARATUS FOR MULTIPATH MITIGATION

(75) Inventors: Thomas P. Zahm, Fort Wayne, IN (US); Benjamin F. Pierce, III, Fort Wayne, IN (US); James E. Hardin, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 847 days.

(21) Appl. No.: 12/638,134

(22) Filed: Dec. 15, 2009

(65) Prior Publication Data

US 2011/0142105 A1    Jun. 16, 2011

(51) Int. Cl.
*H04L 27/28* (2006.01)
(52) U.S. Cl.
USPC ........................................................ 375/260
(58) Field of Classification Search
USPC .... 375/219, 227, 260, 285, 295, 340; 455/59, 455/63.1, 133, 134–135
See application file for complete search history.

(56) References Cited

U.S. PATENT DOCUMENTS

| | | | |
|---|---|---|---|
| 5,289,499 A * | 2/1994 | Weerackody | 375/141 |
| 6,480,522 B1 | 11/2002 | Hoole et al. | |
| 6,621,851 B1 | 9/2003 | Agee et al. | |
| 7,110,349 B2 | 9/2006 | Branlund et al. | |
| 7,142,864 B2 | 11/2006 | Laroia et al. | |
| 7,454,183 B2 * | 11/2008 | Moorti et al. | 455/277.1 |
| 2005/0078650 A1 * | 4/2005 | Ghosh | 370/347 |
| 2007/0002961 A1 * | 1/2007 | Hoctor et al. | 375/267 |

* cited by examiner

*Primary Examiner* — Khanh C Tran
(74) *Attorney, Agent, or Firm* — Daly, Crowley, Mofford & Durkee, LLP (57) ABSTRACT

Methods and apparatus for mitigating multipath signal interference comprising transmitting a first signal and second signal that is a copy of the first signal, transmitting the first signal centered at a first frequency, transmitting the second signal centered at a second frequency separated from the first frequency by a selected distance, receiving at a receiving node the first and second signals, estimating a signal quality of the received first and second signals, and decoding a first one of the received first and second signals based upon the estimated signal qualities of the received first and second signals.

14 Claims, 7 Drawing Sheets

METHODS AND APPARATUS FOR MULTIPATH MITIGATION

BACKGROUND

As is known in the art, multipath induced signal fade can occur in different places at different frequencies. At a particular location, different frequencies can have different levels of attenuation. As is well known in the art, multipath fading can significantly degrade signal quality.

Figure 1:
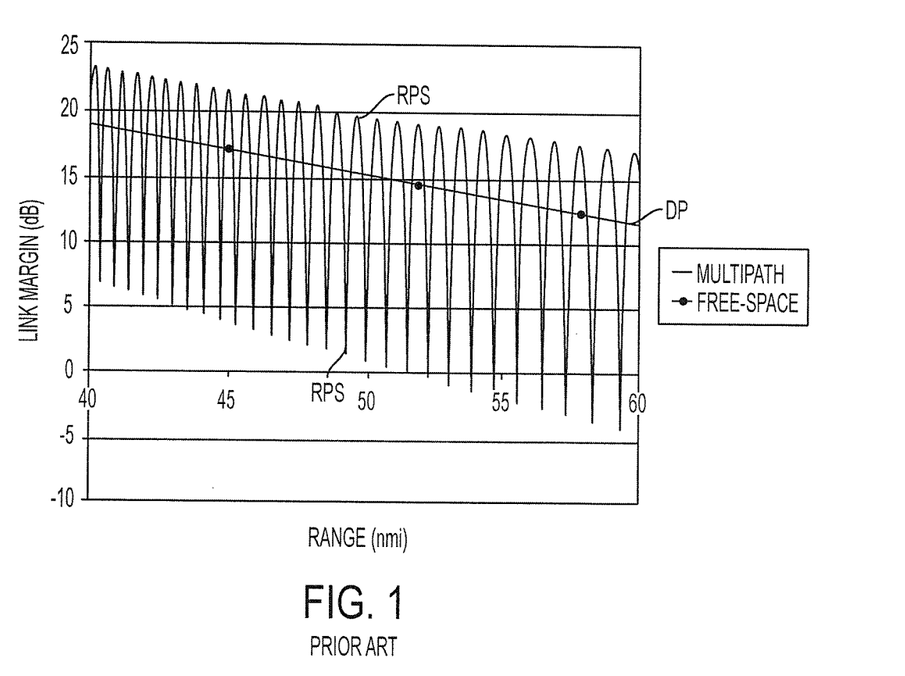
FIG. 1 is a graphical representation of link margin versus range for multipath fading in a prior art system.

FIG. 1 shows fading effects of multipath for an aircraft at about 1500 feet above water communicating with an airborne object at an altitude of about 500-3000 feet. The datalink between the objects has multiple components including a direct path DP signal and reflected phase-shifted signals RPS that interfere constructively and destructively with the direct path signal.

The vertical axis represents the signal margin for a particular link, geometry, and frequency, which can be considered a measure of received signal strength in dB. The horizontal axis is the ground distance between the transmitter and the receiver antennas. It can be readily seen that the signal level decreases as the distance (range) increases. The scalloping of the signal is due to the destructive and constructive interference of the reflected signal with the direct signal due to multipath. When the difference between the direct path length and the reflected path length is a multiple of the wavelength, the signals constructively interact and a peak is produced. When the difference is an odd half multiple of the wavelength, the signals destructively interact and a null is produced.

There a variety of known multipath mitigation techniques. One such strategy increases the transmitter power so that even with multipath fading the received signal is still detectable. Another known technique includes estimating the amplitude and phase shift of the reflected signal component of the received signal for reconstructing the direct-path signal component using the estimates. A further known approach is set forth in IEEE 802.11x teaching wireless applications to employ multiple transmit and receive antennas, which is known as Multiple-Input, Multiple-Output (MIMO). As with previous techniques, it attempts to reconstruct the transmitted signal from a combination of the signals received from the multiple transmit antennas by the multiple receive antennas. This technique is relatively complex and requires additional assets including multiple transmitters and receivers.

Figure 2:
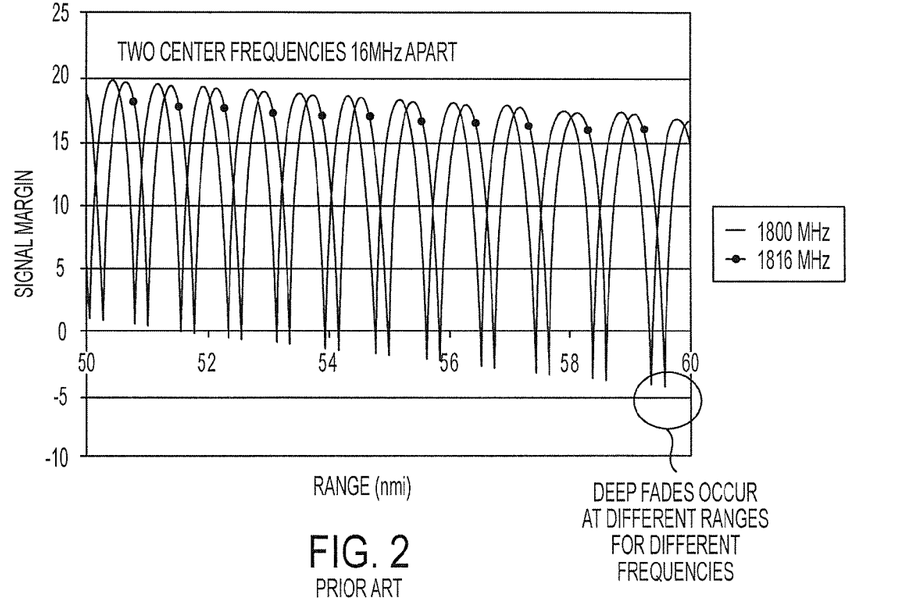
FIG. 2 is a graphical representation of carrier frequency impact on the fading effects of multipath in a prior art system.

The nulls of the fading occur when the indirect (reflected) path length differs from the direct path length by an odd half-multiple of the wavelength $\lambda$ ($1/2\lambda$, $3/2\lambda$, $5/2\lambda$, . . . ). At a different frequency, and hence a different wavelength, the path length differences that give rise to the nulls will shift given the same geometry. In particular, they will occur at different direct path distances between the antennas, as shown in FIG. 2 which employs two different frequencies and plotting both results on one axis.

SUMMARY

The present invention provides methods and apparatus for transmitting a signal and a copy of the signal separated in frequency and decoding the better quality signal. With this arrangement, unused front end bandwidth can be used to mitigate multipath fading with no additional equipment, e.g., transmitters, receivers, and the like.

In one aspect of the invention, a method comprises transmitting a first signal in a first segment and second signal that is a copy of the first signal in a second segment, wherein the first and second segments are spaced at a given frequency distance, transmitting the first signal centered at a first frequency in the first segment, transmitting the second signal in the second segment, receiving at a receiving node the first and second signals, decoding the received first and second signals, estimating a signal quality of the decoded first and second signals, and selecting a first one of the decoded first and second signals based upon the estimated signal quality.

The method can further include one or more of the following features: the first segment has a given bandwidth, the first segment has a bandwidth of about 1.2 MHz, the first segment contains a number of tones, the given frequency distance is about 16 MHz, estimating the signal quality with at least one of signal-to-noise ratio and bit error rate, transmitting the first signal from an aircraft, assigning a waveform to non-contiguous segments.

In another aspect of the invention, a system comprises a transmitter to transmit a first signal in a first segment and a second signal that is a copy of the first signal in a second segment, wherein the first and second segments are spaced at a given frequency distance, wherein the first signal centered at a first frequency in the first segment, and the second signal is transmitted in the second segment, a receiver to receive the first and second signals, a decoder to decode the received first and second signals, a signal estimator to estimate a signal quality of the decoded first and second signals, and a selector to select a first one of the decoded first and second signals based upon the estimated signal quality.

The system can further include one or more of the following features: the first segment has a given bandwidth, the first segment has a bandwidth of about 1.2 MHz, the first segment contains a number of tones, the given frequency distance is about 16 MHz, the signal estimator estimates the signal quality with at least one of signal-to-noise ratio and bit error rate, the first and second signals are transmitted from an aircraft, and a waveform is assigned to non-contiguous segments.

BRIEF DESCRIPTION OF THE DRAWINGS

The foregoing features of this invention, as well as the invention itself, may be more fully understood from the following description of the drawings in which.

DETAILED DESCRIPTION

Figure 3:
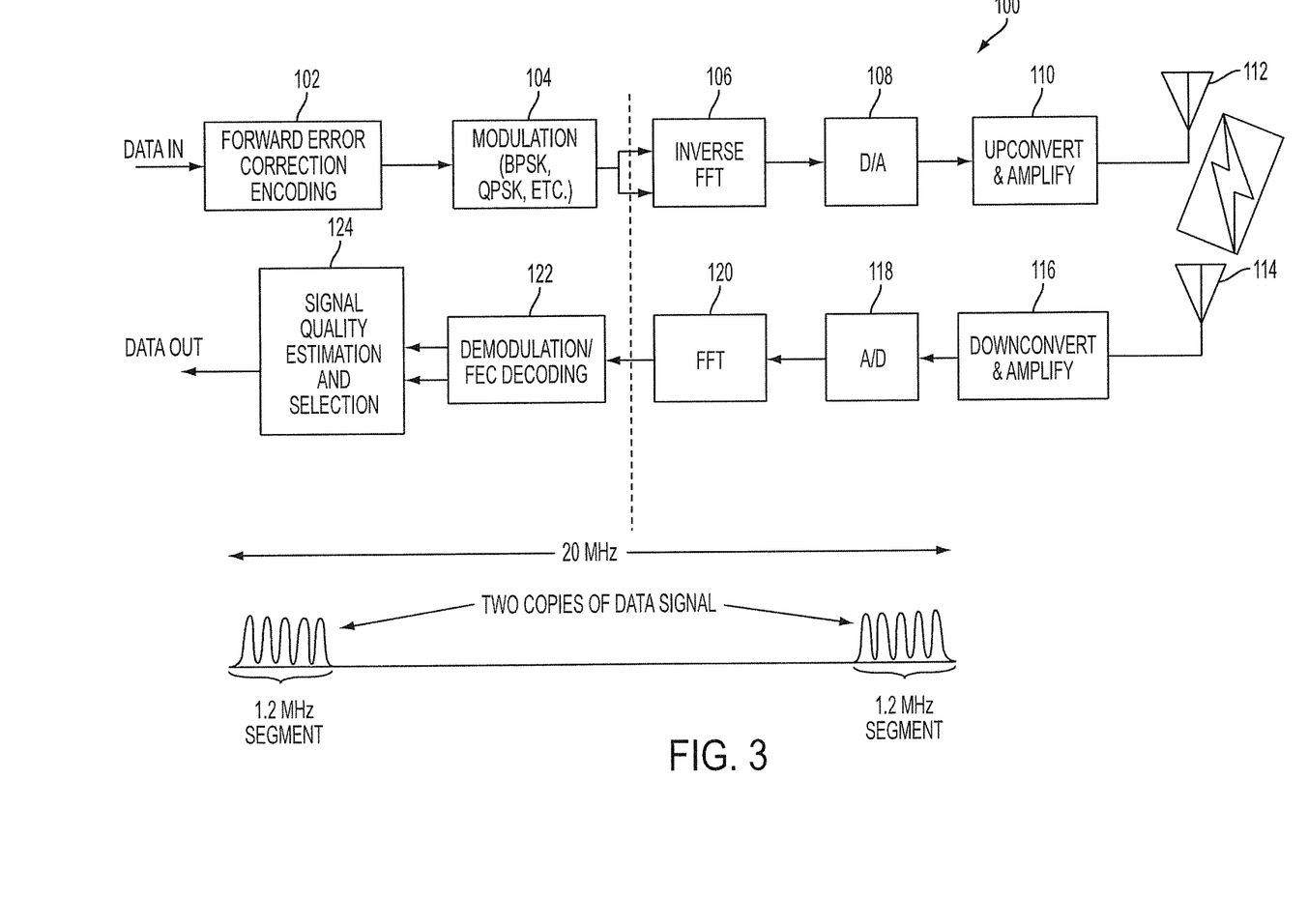
FIG. 3 is a schematic representation of a communication system having multipath mitigation in accordance with exemplary embodiments of the invention.

FIG. 3 shows a system 100 having multipath mitigation in accordance with exemplary embodiments of the invention. Data for transmission is provided to a forward error correction (FEC) module 102 for modulation by a modulation module 104. Exemplary modulations include BPSK, QPSK, and the like. The modulated data is processed in an inverse FFT module 106 and converted to analog by a digital-to-analog converter 108. The analog signal is upconverted and amplified 110 for transmission on an antenna 112. A signal, and a copy of the signal separated in frequency, are transmitted as discussed below in detail.

On the receive side, the system 100 includes an antenna 114 coupled to a downconverter and amplification module 116. The analog signal is converted to digital by an analog-to-digital converter 118 and provided to a FFT module 120. Output from the FFT is processed by a demodulation and decoding module 122. The decoded signal information for the signal, and the copy of the signal, is then provided to a signal quality estimation and selection module 124.

Figure 4:
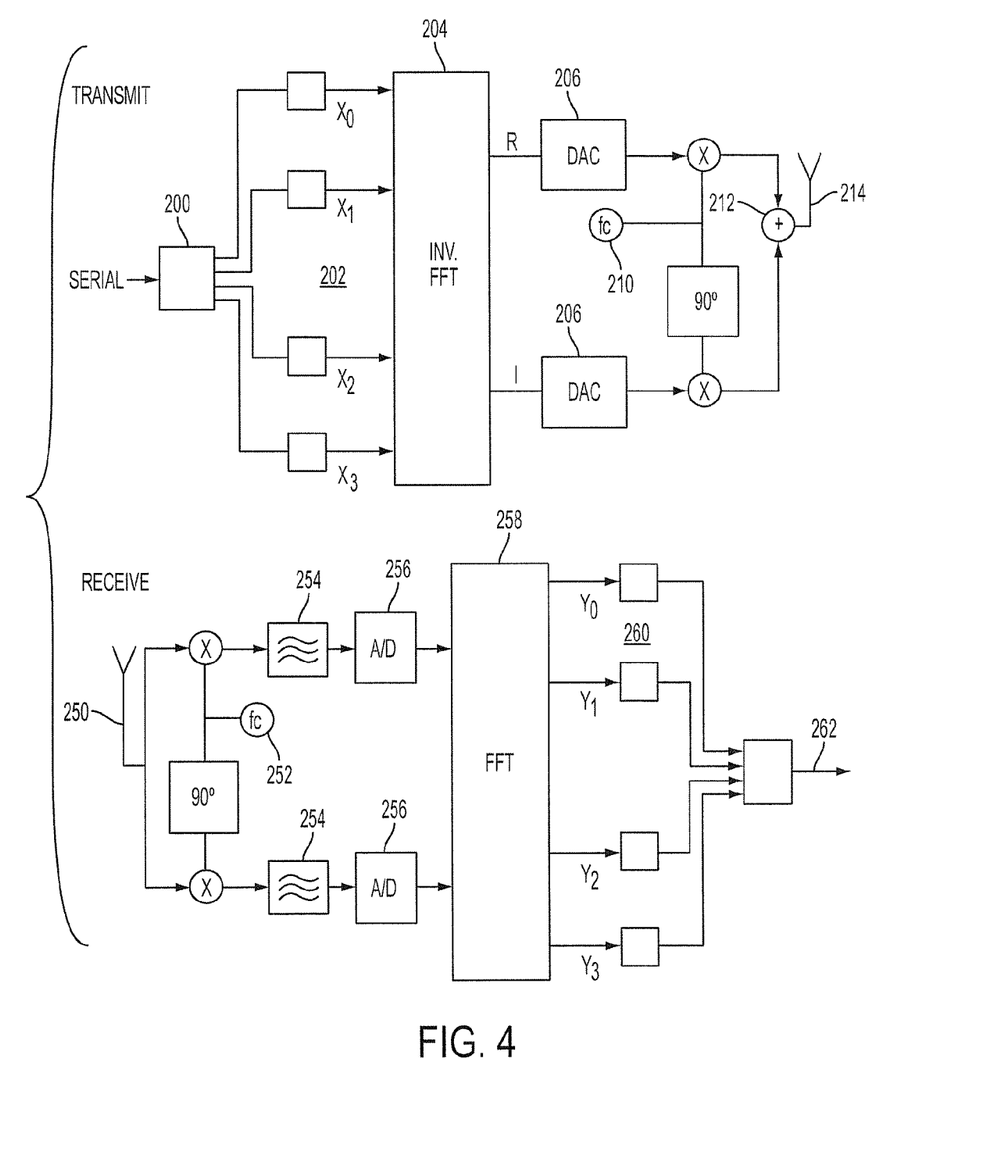
FIG. 4 is a schematic representation showing further details of the system of FIG. 3.

FIG. 4 shows some additional detail for signal transmission and reception in an Orthogonal Frequency Division Modulation (OFDM) system including multipath mitigation in accordance with exemplary embodiments of the invention. An OFDM carrier signal is the sum of orthogonal sub-carriers. Baseband data on each subcarrier is independently modulated using quadrature amplitude modulation (QAM), phase-shift keying (PSK), etc.

More particularly, serial data is inverse multiplexed 200 into N parallel streams and mapped to a symbol stream 202 using some modulation constellation (QAM, PSK, etc.). An inverse FFT 204 is computed on the symbols to generate a set of complex time-domain samples, which are quadrature-mixed to passband. The real R and imaginary I components are converted to analog signals 206 to modulate cosine and sine waves at the carrier frequency 210 and summed 212 to provide the transmission signal 214. A signal and a copy of the signal at a given frequency distance is transmitted.

The receiver receives the transmitted signal 250 and quadrature-mixes the signal to baseband using cosine and sine waves at the carrier frequency 252. This creates signals centered on twice the carrier frequency which are filtered out 254. The baseband signals are sampled and converted to digital signals 256 for FFT processing 258 for conversion back to the frequency domain. The parallel streams 260 are converted to a binary stream using an appropriate symbol detector and re-combined into a serial stream 262, which is an estimate of the original binary stream at the transmitter. The signal, and copy of the signal, are processed to determine which has better quality.

Figure 5:
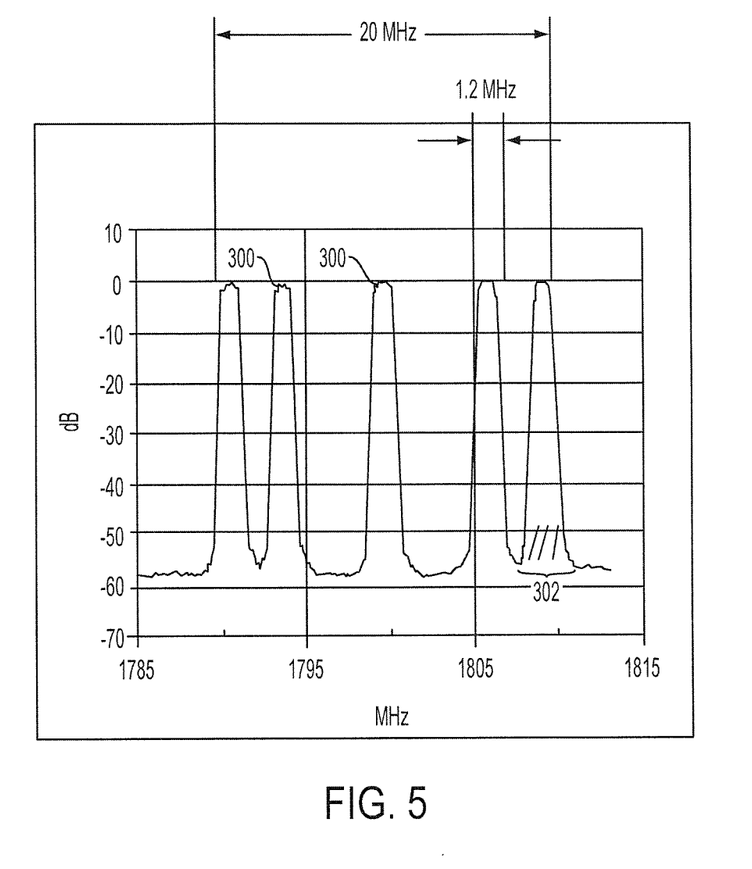
FIG. 5 is a graphical representation of an OFDM system having a series of segments for providing multipath mitigation in accordance with exemplary embodiments of the invention.

In an exemplary embodiment shown in FIG. 5, the system includes 1.2 MHz segments 300 of contiguous bandwidth in a 20 MHz allocation. Each 1.2 MHz segment includes twenty-one contiguous OFDM tones 302 (carriers) at 50 kHz spacing. In one embodiment, the tones are modulated using QPSK or 16-QAM. The system provides 400 tones across the 20 MHz that are available for allocation. In one embodiment, up to six 1.2 MHz allocations across the 20 MHz bandwidth and over 6.7 Mbps can be allocated to a single user. In an exemplary embodiment, the system allows transmitting 'around' known RF signals. A waveform can be assigned multiple non-contiguous 1.2 MHz segments for increased data throughput.

In an exemplary embodiment a predetermined portion of data capacity can be used while maintaining available bandwidth in the 20 MHz front end. For example, an application can use a >600 kbps data rate using one 1.2 MHz segment while maintaining available 20 MHz wide front-end bandwidth.

Figure 5A:
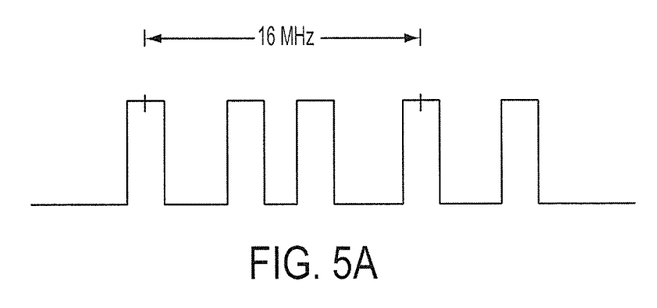
FIG. 5A is a graphical representation showing first and second segments spaced by a selected frequency distance.

This excess bandwidth can be used to mitigate the effects of multipath. In an exemplary embodiment, an encoded signal is transmitted and received on different segments separated in frequency by 16 MHz, for example, as shown in FIG. 5A. Further, at the receiver, signal quality (e.g., SNR, estimated BER, etc.) is measured to identify the higher quality signal to determine which of these redundant transmissions to use as the received data output stream.

While exemplary bandwidths available for allocation, number of tones, segment sizes, tone spacing, and the like are shown, it is understood that these parameters can be varied to meet the needs of a particular application as will be readily appreciated by one of ordinary skill in the art. For example, segment size and tone spacing can be modified to alter the bandwidth allotted to a given user. In addition, any practical number of signal copies can be transmitted to mitigate multipath as desired. In one embodiment, the number of signal copies transmitted can vary based upon signal quality estimation at the receiver.

Figure 6:
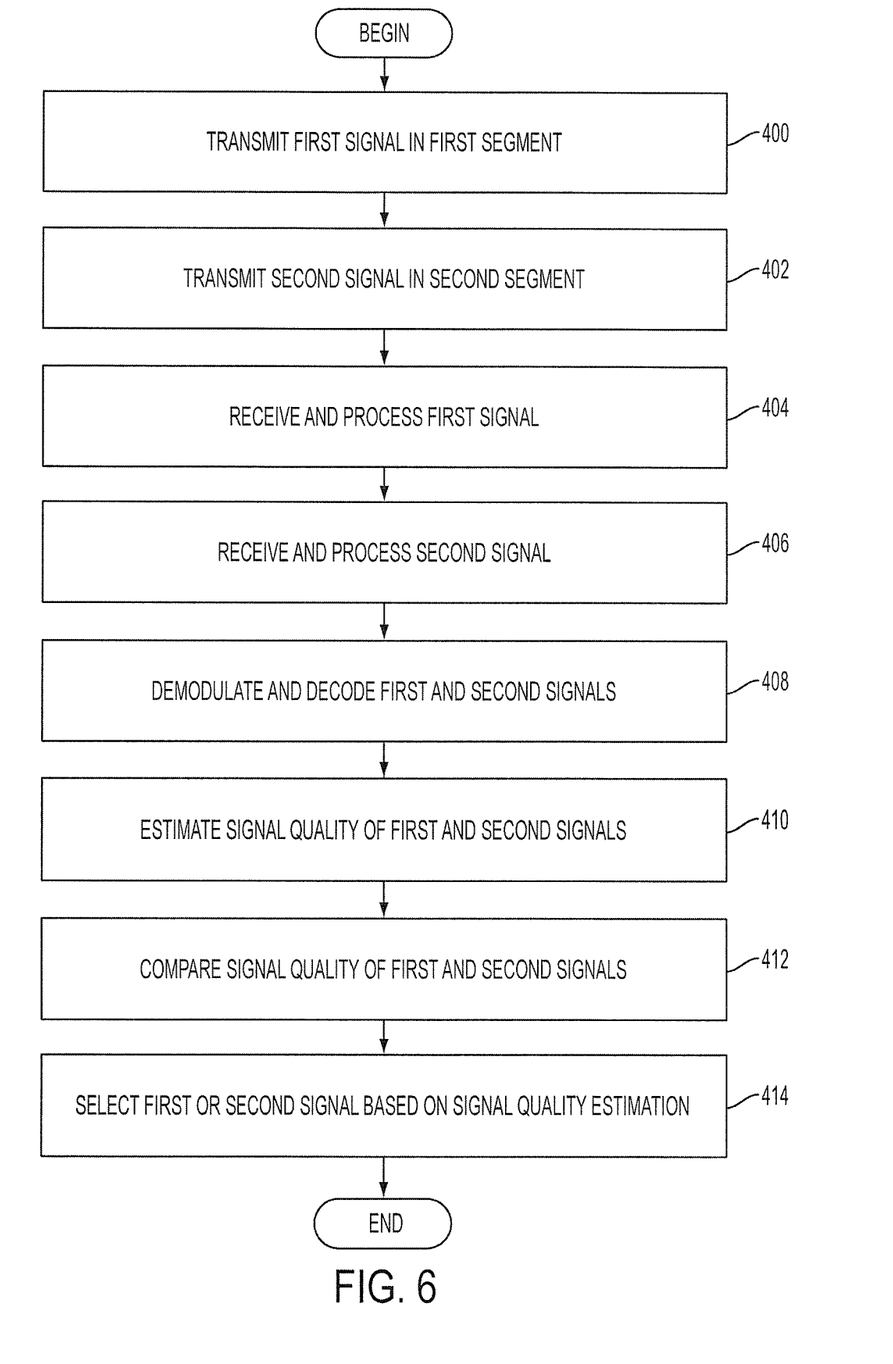
FIG. 6 is a flow diagram showing an exemplary sequence of steps for providing multipath mitigation in accordance with exemplary embodiments of the invention.

FIG. 6 shows an exemplary sequence of steps for mitigating multipath in accordance with exemplary embodiments of the invention. In step 400, a first signal is transmitted on a first segment. In step 402, a second signal, which is a copy of the first signal, is transmitted on a second segment separated in frequency from the first segment by a predetermined distance. It is understood that the first and second signals are transmitted simultaneously in an exemplary embodiment.

In step 404, the first signal is received and processed (e.g., downconverted, amplified, digitized, and FFT processed) and in step 406 the second signal is processed in parallel with the first signal. It is understood that the first and second signals are received simultaneously in an exemplary embodiment. In step 408, the first and second signals are demodulated and decoded. In step 410, the signal quality of the first and second signals is estimated. In step 412, the signal quality estimations are compared and in step 414, the signal having the best signal quality is selected. The selected signal is then sent for further processing.

It is understood that exemplary embodiments of the invention are shown and described having certain architectures, components, frequencies, modulations, and the like. It is understood that various modifications can be made to the exemplary embodiments to meet the needs of a particular application without departing from the scope of the present invention.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   transmitting a first signal in a first segment and second signal that is a copy of the first signal in a second segment, wherein the first and second segments are spaced at a given frequency distance;
   transmitting the first signal centered at a first frequency in the first segment, wherein the first segment contains a number of tones;
   transmitting the second signal in the second segment;
   receiving at a receiving node the first and second signals;
   decoding the received first and second signals;
   estimating a signal quality of the decoded first and second signals; and
   selecting a first one of the decoded first and second signals based upon the estimated signal quality.

2. The method according to claim 1, wherein the first segment has a given bandwidth.

3. The method according to claim 1, wherein the first segment has a bandwidth of about 1.2 MHz.

4. The method according to claim 1, wherein the given frequency distance is about 16 MHz.

5. The method according to claim 1, further including estimating the signal quality with at least one of signal-to-noise ratio and bit error rate.

6. The method according to claim 1, further including transmitting the first signal from an aircraft.

7. The method according to claim 1, further including assigning a waveform to non-contiguous segments.

8. A system, comprising:
- a transmitter to transmit a first signal in a first segment and a second signal that is a copy of the first signal in a second segment, wherein the first and second segments are spaced at a given frequency distance, wherein the first signal centered at a first frequency in the first segment, and the second signal is transmitted in the second segment, and wherein the first segment contains a number of tones;
- a receiver to receive the first and second signals;
- a decoder to decode the received first and second signals;
- a signal estimator to estimate a signal quality of the decoded first and second signals; and
- a selector to select a first one of the decoded first and second signals based upon the estimated signal quality.

9. The system according to claim 8, wherein the first segment has a given bandwidth.

10. The system according to claim 8, wherein the first segment has a bandwidth of about 1.2 MHz.

11. The system according to claim 8, wherein the given frequency distance is about 16 MHz.

12. The system according to claim 8, wherein the signal estimator estimates the signal quality with at least one of signal-to-noise ratio and bit error rate.

13. The system according to claim 8, wherein the first and second signals are transmitted from an aircraft.

14. The system according to claim 8, wherein a waveform is assigned to non-contiguous segments.

* * * * *